United States Patent [19]

Moskovits

[11] Patent Number: 4,472,533

[45] Date of Patent: Sep. 18, 1984

[54] HETEROGENEOUS CATALYST AND PROCESS FOR ITS MANUFACTURE

[75] Inventor: Martin Moskovits, Toronto, Canada

[73] Assignees: The University of Toronto Innovations Foundation, Toronto, Canada; The University of Toronto Innovations Foundation, Toronto, Canada

[21] Appl. No.: 450,096

[22] Filed: Dec. 15, 1982

Related U.S. Application Data

[63] Continuation-in-part of Ser. No. 264,069, May 15, 1981, abandoned.

[30] Foreign Application Priority Data

May 20, 1980 [CA] Canada ................................. 352275

[51] Int. Cl.$^3$ ..................... B01J 21/04; B01J 23/24; B01J 23/56; B01J 23/74
[52] U.S. Cl. .................................. 502/320; 502/322; 502/323; 502/324; 502/332; 502/333; 502/334; 502/335; 502/336; 502/344; 502/346; 502/348; 502/349; 502/351; 502/354; 502/355
[58] Field of Search ............... 252/465, 466 J, 477 R; 502/320, 322, 323, 324, 332, 333, 334, 335, 336, 344, 346, 348, 349, 351, 354, 355, 527

[56] References Cited

U.S. PATENT DOCUMENTS

| | | | |
|---|---|---|---|
| 3,886,095 | 5/1975 | Ford et al. | 252/466 J |
| 3,920,583 | 11/1975 | Pugh | 252/465 |
| 3,944,504 | 3/1976 | Ford et al. | 252/466 PT |

Primary Examiner—W. J. Shine
Attorney, Agent, or Firm—Murray, Whisenhunt and Ferguson; Murray, Whisenhunt and Ferguson

[57] ABSTRACT

Catalysts for use in promoting heterogeneous chemical reactions, such as hydrogenation, cracking, dehydrogenation and Fischer-Tropsch reactions, are prepared by depositing a catalytically active metal such as nickel electrolytically onto an aluminum substrate in such a manner that the metal particles are deposited in microparticulate form to enhance their catalytic activity. The aluminum substrate is prepared by cleaning and anodizing it, so as to deposit thereon an aluminum oxide surface film having micro porosity. Then the substrate is immersed into an electrolysis bath of solution of salt of the metal to be deposited, and subjected to alternating current electrolysis to cause the required deposition. Prior to use, the catalysts so prepared should be heated to remove absorbed gases from their porous surfaces.

12 Claims, No Drawings

HETEROGENEOUS CATALYST AND PROCESS FOR ITS MANUFACTURE

This application is a continuation-in-part application of copending application Ser. No. 264,069, filed May 15, 1981, now abandoned.

This invention relates to herterogeneous catalysts and processes for their manufacture. More particularly, it relates to processes and catalysts which have catalytically active metals deposited upon a support substrate, namely aluminum oxide, useful for promoting chemical reactions in the gas phase.

A large number of commercial catalytic chemical processes, such as hydrogenation, cracking dehydrogenation and Fischer-Tropsch, are carried out in the presence of solid compositions comprising small metal particles dispersed on support materials which are commonly oxides such as those of silicon, aluminum, titanium or zirconium. These compositions act as the catalyst which speeds up the desired chemical reaction to a rate sufficient to make it commercially feasible.

Currently these catalysts are made by various processes, some of which are proprietary, which in broad terms involve the impregnation of the support material with a soluble compound of the desired metal, heating in vacuo and reducing the compound to the zerovalent metal in hydrogen, carbon monoxide or another suitable reducing agent.

Although catalysts of good quality have been made in this manner over the past fifty years or so, there is still active interest in industry in new techniques for making both established and new catalysts. This interest stems from several needs. One is the desirability of catalysts which are specific to one or a specific set of reactions, so that in a mixture of reagents (for example, in crude oil) one or several are caused to undergo a given process while others are untouched. This has lately been accomplished by making mixed metal catalysts. Another is the requirement to minimize the energy used to make catalysts; clearly the reduction of the compound to metal is an energy-consuming process. Another is the need to make a catalyst reproducibly so that its efficacy compares well from batch to batch.

The present invention provides a novel technique for fabricating supported metal catalysts which is capable of a continuous manufacturing process, allows reproducibility, and enables one to support simultaneously a mixture of metals in a variety of proportions.

According to a first aspect of the present invention, there is provided a process for preparing catalysts useful in promoting heterogeneous catalytic chemical reactions, and comprising an aluminum or aluminum metal containing substrate having deposited thereon at least one metal selected from nickel, copper, cobalt, iron, manganese, titanium, vanadium, silver, gold, platinum, scandium, hafnium, niobium, chromium, molybdenum, zirconium, tungsten and palladium, said process including the steps of:

cleaning the aluminum or aluminum metal containing substrate;

anodizing the cleaned metal substrate, to produce a suitably pitted or porous oxide substrate surface;

rinsing the anodized substrate, substantially to remove therefrom acid residues remaining from the anodizing step;

subjecting the substrate in contact with a liquid solution of a salt of said at least one metal to electrolysis with alternating current, to deposit the metal onto the substrate in small particle catalytically active form;

and removing excess liquid solution from the so-treated substrate.

According to a second aspect of the present invention there is provided a catalyst for promoting heterogeneous catalytic chemical reactions, said catalyst comprising:

a substrate of aluminum or aluminum alloy containing a high proportion of aluminum;

at least one metal selected from nickel, copper, cobalt, iron, manganese, titanium, vanadium, silver, gold, platinum, scandium, hafnium, niobium, chromium, molybdenum, zirconium, tungsten and palladium:

said at least one metal being present on the surface of the substrate in discrete, micro-particulate form in pits and pores created in the substrate surface by anodizing thereof;

said metal being in direct contact with atmosphere surrounding the substrate.

A third aspect of the present invention provides a method of conducting a heterogeneous catalyst-promoted reaction which comprises contacting at least one reagent with a catalyst as previously described, and recovering the reaction products therefrom.

The substrate of the catalyst of the present invention is aluminum metal or an alloy or composition thereof, e.g. aluminum-magnesium alloy, containing at least a major proportion of aluminum metal. It is suitable and convenient to use aluminum in the form of thin metal foil, for example the type of foil commonly used in domestic cooking applications. Such a form of substrate lends itself well to continuous handling and treatment, being available in long rolled lengths capable of being rolled and unrolled continuously. However, the invention is not limited to any specific form of aluminum substrate, and is applicable to use with aluminum strips, rods, sheets, plates, films and the like.

One particularly advantageous feature of the present invention pertains to the use of the catalyst of the invention in promoting exothermic reactions. Since the catalysts are based upon an aluminum metal or aluminum metal alloy substrate, they have very good heat conducting properties. Advantage may be taken of this feature, in designing structures of catalysts according to the present invention which will conduct heat of reaction away from the reaction zone, e.g. to appropriate heat exchangers. Specific examples of highly exothermic reactions which can be catalysed by a solid phase catalyst according to the present invention are catalytic oxidations such as the formation of ethylene oxide from ethylene and oxygen.

Thus, the catalyst of the present invention may be made from an aluminum sheet substrate, which is cleaned, anodized and onto which the chosen metal is electrolytically deposited as described herein, following which the sheet is cut into cupons, or alternatively rolled or formed into a reactor vessel or into heat exchange tubing. Alternatively, the catalytic metal may be deposited, by the techniques described herein, onto aluminum particles, spheres, gauze, wire, chips, flakes or wool. In a further alternative, using the process of the present invention, one can deposit catalytic metal directly onto a surface of an aluminum or an aluminized reactor vessel or tubing through or in which the feedstocks will pass and hence contact the catalytic surface. The heat can be conducted away by means of appropriate heat exchangers.

As an early step in the process of the present invention, the substrate is cleaned for the purpose of removing grease from the surface thereof. This is best accomplished with a suitable organic solvent and then with an alkaline chemical liquid, so as to achieve a degree of surface etching, followed by neutralization of any residual alkali excess with acid. Sodium carbonate solution is a suitable base, followed by nitric acid, but many other chemicals can be chosen and used for this purpose. The preferred cleaning process is ultrasonic cleaning in dichloromethane, followed by treatment with dilute sodium carbonate and then with dilute nitric acid. It may also be desirable to remove oxide formed during the etching process.

Then the treated substrate is electrolytically anodized, for the purpose of depositing on the metal a surface porous layer of oxide. This anodizing is best accomplished by making the metal the anode of an electrolytic cell, using inert (e.g. lead) counter-electrodes, in an acidic bath. Suitably, the bath is a relatively dilute solution of a strong inorganic acid, such as sulphuric acid or phosphoric acid. In practice, a 10% phosphoric acid solution has been found to be most satisfactory, in providing pores of suitable diameter. Direct current is passed through the cell between the electrodes, at a current and voltage suitably adjusted to provide the correct film deposition. This operation is suitably conducted at room temperatures. In practice, a current of the order of fourteen milli-amps per square centimeter, at a voltage of fourteen volts, in 10% phosphoric acid has been found to provide suitable surface oxide characteristics.

After suitable anodizing as described, the substrate is removed from the anodizing bath and rinsed. It is important to rid the surface of the treated substrate of residual acid, and neutralize it at this point. It is, however, undesirable to neutralize the acid chemically, since this might have the effect of damaging the deposited film. However, if residual acid is left at the subsequent electrolysis step, hydrogen will be generated, which is undesirable. It is preferred to rinse the anodized film with suitable quantities of water, to remove acid and effect sufficient neutralization.

Next, the catalytic metal or metals are deposited electrolytically onto the so-prepared substrate. In this process, the substrate is placed in an electrolyte having dissolved therein ions of the metal or metals to be deposited, along with an inert counterelectrode, e.g. graphite, and alternating current is passed between the two electrodes in the electrolyte. Normally the electrolyte will be an aqueous solution of suitable salts of the metals to be deposited, but it can under certain circumstances if desired be a non-aqueous solution. When nickel is to be deposited, nckel sulphate is suitably dissolved in the electrolyte medium. It is preferred to maintain the electrolyte at a substantially constant, slightly acidic pH, e.g. about 5. This is suitably done by addition to the bath of appropriate quantities of weak acid such as boric acid, to avoid substantial evolution of gaseous hydrogen during the process. One should avoid use in the electrolyte bath of salts of metals which contribute to the solution anions which would themselves harm the coating on the aluminum substrate during the process, e.g. by oxidation.

The use of alternating current in this electrolysis step is essential in the process of the invention. Alternating current causes the metal ions to become reduced (or in some cases oxidized) and deposited as metals in the porous oxide coating, in the desired small particle form for enhanced catalytic activity. The time for which the current is passed does not appear to be particularly critical, provided that it is longer than about 2-3 minutes. Results indicate that there is an initial surge of metal deposition, the rate of which rapidly declines after the first few minutes. Times of about 15 minutes, at RMS 9 volts alternating current have been found suitable, when depositing nickel from nickel sulphates in a boric acid containing bath. Increased voltages, at least with nickel sulphate, appear to give inferior results. The optimum voltage needs to be determined with respect to each selected metal for deposition, and is related to the electrochemical property of the chosen metal.

Following the electrolytic deposition of the metal, the treated metal substrate is suitably rinsed and cleaned, to rid the metal of residual boric acid. It may further be cleaned, e.g. by ultrasonic cleaning in ethanol. In practice, these final cleaning steps to remove the residual boric acid are best conducted immediately prior to use of the material in a catalytic reaction, since it appears that the residual boric acid may afford some protection against deterioration of the surface quality of the material on storage.

Whilst it is not intended to be bound or limited by any particular theory of operation of the present invention, it is believed that the process has the effect of creating on the oxide surface of the aluminum substrate pores or pits of the optimum size for deposition therein of the catalytically active metal, such as nickel, in a highly catalytically active form. The pores or pits are small enough to prevent the formation therein of macro-metal deposits, which are catalytically less active, but are large enough to permit the entry of reactant gases, in the heterogeneous catalytic process, to contact these gases with the active metals. In any event, the process of the present invention produces highly active catalysts, and is relatively simple, inexpensive and rapid to conduct. The results obtained thereby are reproduceable.

In order to use these materials as heterogeneous catalysts, it is preferred initially to vacuum treat them, which results in evolution of gases which have been absorbed in the pore structures of the surface layers from the air during storage. In fact, the evolution of such gases on vacuum treatment is an indication of surface activity of the catalysts. This removal of absorbed gases takes place by heating under vacuum, suitably at temperatures not exceeding about 350° C., to avoid destruction of the surface activity of the catalysts. This "activation" process is merely a heating under vacuum, e.g. for about one hour, as opposed to an energy intensive reduction process normally conducted on the preparation of heterogeneous catalysts. The heating under vacuum process appears to enlarge the surface area of the catalytic material.

Now the catalyst is ready for use in promoting heterogeneous catalytic reactions. Its manner of use is substantially the same as known for other forms of heterogeneous catalyst. Reagents are contacted with the catalyst under appropriately chosen reaction conditions of temperature and pressure. The processes may be conducted batchwise, or continuously, with the reagents flowing over a stationary or moving batch of catalysts. Details of suitable operating conditions and procedures will be well known to those skilled in the art.

In the preferred catalyst preparation process according to the present invention, on a large scale, the catalyst is made by continuously unrolling commercial aluminum foil off a roll, and passing it continuously through the required cleaning, anodizing, rinsing, AC-electrolysis and final cleaning baths, setting the times required in each station by a combination of the overall feed rate and the length of path in each tank. The final product may be re-rolled for compact storage.

The process and materials according to the present invention have several advantages over existing catalyst fabrication techniques. For given concentrations of electrolytes, temperature and voltage-current settings, one can obtain catalysts of highly reproduceable quality. Multimetal catalysts can be made with ease, by choice of suitable mixtures of metal salts in the AC-electrolysis bath. The highly energy-intensive reduction step used in most catalyst preparations is greatly curtailed, since, in the process according to the present invention, the metal is reduced electrochemically while under ordinary circumstances the metal salt and its support material must be heated to a high temperature in order to effect reduction.

The catalysts made according to the present invention have been found to be highly catalytically reactive in the same range of gas phase catalytic reactions for which they are previously known, in respect of particular metal or metals deposited on the substrate. Thus, nickel has been found actively to catalyse the reaction between carbon monoxide and hydrogen, to produce methane and carbon dioxide. Similarly, it catalyses the dehydrogenation of cyclohexane to benzene and the hydrogenation of propylene with gaseous hydrogen to propane.

In catalytic reactions which are highly exothermic, such as ethylene oxidation on silver and Fischer-Tropsch synthesis on iron, the particular physical form of the catalysts of the present invention, namely a metal particle loaded oxide in intimate contact with an aluminum backing is of great benefit in dissipating the heat of reaction. The initimate contact is ensured by the electrochemical process used to manufacture the catalyst. The enhanced heat dissipation is advantageous in prolonging the catalyst life and altering the progress of the reaction in other ways.

Indeed, the catalysts of the present invention behave differently from known commercial catalysts, of superficially similar compositions, in several respects, largely on account of their novel structure. For example, a nickel-on-aluminum catalyst according to the present invention, as compared with a commercially available Alpha-Ventron catalyst (catalogue N11847) consisting essentially of nickel-aluminum-silica, gives turnover numbers for room temperature hydrogenation of propylene larger by factors between two and four. As set out in the specific examples given below, a palladium-on-aluminum catalyst behaves substantially differently from a commercially available Union Carbide palladium-on-aluminum catalyst of similar composition, in respect of diene and acetylene hydrogenation. Nitric oxide (NO) reduction with a nickel-on-aluminum catalyst of the present invention proceeds just as rapidly as, and uses less hydrogen than, a similar process using a commercially available nobel metal catalyst (platinum-nickel catalyst from United Catalysts).

The invention is further illustrated in the following specific examples.

EXAMPLE I

A sample of commercial household aluminum foil of size about 10 cm by 6 cm., was ultrasonically cleaned in dichloromethane, dipped for one minute in 2.5% aqueous sodium carbonate solution at 70°–90° C., then dipped in 50% aqueous nitric acid for 20 seconds. The sample was then anodized in 10% phosphoric acid for one hour using lead counterelectrodes. Approximtely 14 volts DC, were applied to the sample. The current changes during anodization process from an initial surge to a very low value as anodization proceeds.

After rinsing in distilled water, the sample was placed in an aqueous nickel sulphate solution made in the proportions 120 grams nickel sulphate per liter and 45 grams boric acid per liter. Approximately 9 volts (RMS) AC was applied between the anodized aluminum sample and graphite counterelectrodes for 15 minutes.

After rinsing in distilled water, the sample was given a final ultrasonic cleaning in ethanol. The sample so generated was velvet-black in colour.

The sample was then used to catalyse a gas phase hydrogenation of propylene with hydrogen, to produce propane.

The sample was cut into several thin strips, packed into a glass tube and mounted onto the inlet of a vacuum system equipped with a Leybold-Heraeus IQ 200 quadrupole mass spectrometer. The glass tube was surrounded by an electric furnace for heating purposes, with a thermocouple connected to the aluminum foil, accurately to determine its temperature. On evacuation at room temperature, and at higher temperatures, the catalyst evolved oxygen, carbon monoxide, carbon dioxide, water vapour, hydrogen and several other species, indicating its surface activity. The sample was then heated for one hour at approximately 300° C. as gauged by the thermocouple. After cooling to room temperature, a Stoichiometric propylene/hydrogen mixture was admitted to the tube to contact the catalyst, at a total pressure of approximately 30 torr. Close to 50% conversion to propane was realized after 40 minutes of such contact, and as much as about 25% conversion after 15 minutes.

This experiment was repeated several times, using different pressures, in the range 30–70 torr, in the glass reaction tube containing the reactant gases and the catalyst, and substantially similar results in terms of conversion were obtained in each of the experiments.

Surface area determinations were conducted on a sample of the catalyst, by admitting a nitrogen/helium mixture into a known volume containing the catalyst. The initial nitrogen/helium ratio and the total pressure were measured with a mass spectrometer and diaphragm gauge respectively. The sample was cooled to the temperature of liquid nitrogen and the measurements repeated. By repeating the entire procedure with various values of total pressure, a BET isotherm is generated, and a surface area of approximately 2.5 square meters is obtained for a catalyst sample of approximately 78 square centimeters (counting both sides of the foil).

EXAMPLE II

A nickel catalyst was prepared using the procedure described previously, activated as described, in the same apparatus, and used to catalyse the gas phase reaction between carbon monoxide and hydrogen, to produce methane and carbon dioxide.

The reactant gases were admitted to the glass tube containing the catalyst, and the reaction conducted initially at a pressure of 47 torr, at 350° C. The progress of the reaction was followed by mass spectrometer measurements, with the following results:

| TIME (Minutes) | PERCENT REACTION |
|---|---|
| 2 | 3.8 |
| 20 | .7 |
| 40 | 8.2 |
| 60 | 10.7 |
| 75 | 16.0 |
| 135 | 18.0 |

It will be appreciated that these conversion figures are remarkably high for a reaction conducted at this pressure level. Normally, such a process is conducted at superatmospheric pressures, up to about 400 atmospheres. The catalysts of the present invention, however, produce acceptable reaction figures even at pressure as low as 47 torr, so that their performance at higher pressures is likely to be extremely impressive.

EXAMPLE III

A nickel catalyst on an aluminum substrate was prepared as described in connection with Example I, similarly activated, and then used in the same apparatus to catalyse the dehydrogenation of cyclohexane to benzene. The gas phase catalytic reaction was conducted, in the same apparatus, at a temperature of 305° C., and a pressure of 50 torr, the gases remaining in contact with the catalyst for a length of time of approximately 12 hours. Twenty-two percent conversion to benzene was achieved over this period of time.

EXAMPLE IV

In a similar manner to that described above, a catalyst was prepared having iron deposited on aluminum foil substrate, using in the electrolysis bath a solution of ferrous sulphate, along with boric acid, instead of the nickel sulphate described in Example I. Otherwise, the catalyst was prepared as described. A catalyst was activated by heating with hydrogen using microwave heating techniques, to temperatures about 500° C. Then it was used in the previously described apparatus to catalyse the gaseous decomposition of ammonia into nitrogen and hydrogen. In the first such experiment, the reaction was conducted at 500° C., and a pressure of about 50 torr, and 45% conversion was accomplished, after a reaction time of about 220 minutes.

In a second experiment, the reaction was conducted at 300° C. at a pressure of about 25 torr, and 82% conversion was achieved in a time of about 30 minutes.

In the third experiment, the reaction temperature of 265 and the reaction pressure of 25 torr were chosen, and 60% conversion in about 15 minutes was achieved. All of these experiments appear to be independent of the pressure in the reactor.

EXAMPLE V

A catalyst was prepared as described above, except that copper was deposited onto the aluminum substrate, as the catalytic metal, using an electrolyte of copper sulphate in the presence of sulphuric acid. The suitable deposition of copper for catalytic purposes is clearly indicated, by the colour of the catalytic material used.

EXAMPLE VI

Using the techniques described above, but electrodepositing palladium metal from chloropalladinic acid solution using AC and an aluminum foil electrode, a 0.5% palladium on aluminum catalyst was prepared, comparable in composition to a 0.5% palladium-on-aluminum from Union Carbide Corporation, which is understood to be prepared by a process involving solution impregnation of the substrate with a solution of a palladium compound, followed by heating in vacuo and reduction in hydrogen. The catalysts were used in diene and acetylene hydrogenation reactions, out of the same reaction conditions, for comparison purposes.

When each catalyst was contacted with a mixture of hydrogen and butadiene at room temperature, the catalyst of the invention showed a slower rate of hydrogenation reaction than that of the Union Carbide catalyst. When mixtures of vinyl acetylene and hydrogen were used, however, the situation was reversed, thus indicating that the catalyst of the present invention have a high selectivity towards hydrogenation of acetylenes as compared to dienes.

Further experiments were conducted with each catalyst, contacting them each with a 1:1:2 mixture of 1, 3 butadiene, vinyl acetylene and hydrogen, at room temperature. After 1 or 5 minutes of contact, the product distribution was analysed. The results are given in the following table A

| PRODUCT | CATALYST OF THE INVENTION | COMMERCIAL UNION CARBIDE CATALYST |
|---|---|---|
| n - butane | 33.1% | 46% |
| 1 - butene | 29.9% | 4% |
| t-2 butene | 18.3% | 7.3% |
| c-2 butene | 7.1% | 2.6% |
| 1,3-butadiene | 18.3% | 22.4% |
| 1-buten-3-yne | 10.4% | 18.1% |

EXAMPLE VII

A catalyst was prepared according to the procedure described in Example I, except that silver was electrodeposited onto the cleaned anodized aluminum substrate from a silver nitrate solution, to form a 5% (by weight) silver-on-aluminum substrate catalyst. A gas mixture consisting of 90% ethylene and 10% oxygen was contacted with the catalyst at 180° C. A selectivity towards the formation of ethylene oxide of about 60% was obtained, an extremely high figure for an unpromoted catalyst.

EXAMPLE VIII

An iron-on-aluminum catalyst (about 5% iron by weight) was prepared by the electrolysis procedure described in example IV, and activated by dipping in approximately 1M potassium hydroxide solution before cleaning in vacuo, and oxidizng in oxygen gas. The catalyst so prepared was used in Fischer Tropsch reaction, reacting carbon monoxide with hydrogen in the gas phase, at a variety of starting pressures, temperatures and reactant ratios. The results were compared with those obtained with commercial iron/alumina catalysts supplied by Alpha Ventron corporation, using equivalent masses of catalysts. In each case, the catalysts were promoted with potassium hydroxide and oxidized in oxygen before the reactions were begun.

The results given in Table B are typical. These derive from experiments using 3:1 hydrogen to carbon monoxide (v/v) mixtures, and show the product distribution after twenty-four hours of contact.

|  |  | Catalyst Fe/Al, Example 7 | Catalyst Alpha Ventron |
|---|---|---|---|
| Initial Temperature (°C.) |  | 470 | 415 |
| Initial Pressure (Torr) |  | 420 | 330 |
| Final | $H_2$ | 112.6 | 66.8 |
| Gas | CO | 3.9 | 24.0 |
| Composition | $CH_4$ | 13.0 | 11.8 |
|  | $C_2H_6$ | 1.6 | 0 |
|  | $C_3H_8$ | 2.54 | 0.39 |
|  | $CO_2$ | 12.8 | 10.2 |
|  | $H_2O$ | 3.5 | 6.9 |
| Efficiency | H% | 13 | 10.3 |
|  | C% | 15.1 | 15.3 |

These results illustrate that the catalysts of the invention, under similar conditions, produce significant quantities of ethane and propane, whilst the commercial catalyst produces almost exclusively methane. This occurs at low reagent pressures, usually unfavorable circumstance for the production of hydrocarbons higher than methane.

EXAMPLE IX

The nickel containing catalyst prepared according to the invention as described in example I was used for the reduction of nitric oxide by methane and by hydrogen to form nitrogen, ammonia and water. The reaction was conducted at a temperature of 300° C., using a 2:1 molar mixture of hydrogen to nitric oxide. The nitric oxide was reduced at approximately the same rate as in a similar experiment, conducted under similar conditions, using a platinum-nickel catalyst (G43) supplied by United Catalysts Inc. Thus, the base metal catalyst produced according to the process of the present invention performs as well on a program of catalyst basis, as the noble metal commercial catalyst.

I claim:

1. A process for preparing catalysts useful in promoting heterogeneous catalytic chemical reactions, and comprising an aluminum or aluminum metal containing substrate having deposited thereon at least one metal selected from nickel, copper, cobalt, iron, manganese, titanium, vanadium, silver, gold, platinum, scandium, hafnium, niobium, chromium, molybdenum, zirconium, tungsten and palladium, said process including the steps of:

cleaning the aluminum or aluminum metal containing substrate;

anodizing the cleaned metal substrate, to produce a suitably pitted or porous oxide substrate surface;

rinsing the anodized substrate, substantially to remove therefrom acid residues remaining from the anodizing step;

subjecting the substrate in contact with a liquid solution of a salt of said at least one metal to electrolysis with alternating current, to deposit the metal onto the substrate in small-particle, catalytically active form;

and removing excess liquid solution from the so-treated substrate.

2. The process of claim 1 wherein the substrate is aluminum foil.

3. The process of claim 2 wherein the process is conducted continuously by passing a continuous long length of aluminum foil through successive cleaning, anodizing, rinsing, AC-electrolyzing and final cleaning stations, with appropriate residence times in each station.

4. The process of claim 1, wherein the metal is nickel, deposited by AC-electrolysis from an aqueous nickel sulfate solution.

5. The process of claim 2, wherein the metal is nickel, deposited by AC-electrolysis from an aqueous nickel sulfate solution.

6. The process of claim 3, wherein the metal is nickel, deposited by AC-electrolysis from an aqueous nickel sulfate solution.

7. A catalyst for promoting heterogeneous catalytic chemical reactions, said catalyst comprising:

a substrate of aluminum or aluminum alloy containing a high proportion of aluminum;

at least one metal selected from nickel, copper, cobalt, iron, manganese, titanium, vanadium, silver, gold, platinum, scandium, hafnium, niobium, chromium, molybdenum, zirconium, tungsten and palladium;

said at least one metal being present on the oxide surface of the substrate in discrete, micro-particulate form in pits and pores created in the substrate surface by anodizing thereof;

said metal being in direct contact with atmosphere surrounding the substrate.

8. The catalyst of claim 7 wherein said at least one metal is deposited in pits and pores of an aluminum oxide surface layer deposited on the surface of the substrate by anodizing thereof.

9. The catalyst of claim 8 wherein the metal is deposited by AC-electrolysis of a solution of a salt of the metal in contact with the anodized substrate.

10. The catalyst of claim 7, wherein said at least one metal is nickel.

11. The catalyst of claim 8, wherein said at least one metal is nickel.

12. The catalyst of claim 9, wherein said at least one metal is nickel.

* * * * *